United States Patent
Huang et al.

(10) Patent No.: US 10,964,107 B2
(45) Date of Patent: Mar. 30, 2021

(54) SYSTEM FOR ACQUIRING CORRESPONDENCE BETWEEN LIGHT RAYS OF TRANSPARENT OBJECT

(71) Applicant: SHENZHEN UNIVERSITY, Guangdong (CN)

(72) Inventors: Hui Huang, Guangdong (CN); Bojian Wu, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 8 days.

(21) Appl. No.: 16/545,505

(22) Filed: Aug. 20, 2019

(65) Prior Publication Data
US 2020/0035022 A1 Jan. 30, 2020

Related U.S. Application Data

(63) Continuation of application No. PCT/CN2018/097188, filed on Jul. 26, 2018.

(51) Int. Cl.
*G06T 17/30* (2006.01)
*G01B 11/22* (2006.01)
(Continued)

(52) U.S. Cl.
CPC .............. *G06T 17/30* (2013.01); *G01B 11/22* (2013.01); *G01B 11/24* (2013.01); *G01B 11/26* (2013.01)

(58) Field of Classification Search
CPC ..... G01B 11/22; G01B 11/24; G01B 11/2504; G06T 7/50
See application file for complete search history.

(56) References Cited

U.S. PATENT DOCUMENTS

| 5,004,909 A * | 4/1991 | Fukuchi | G01N 21/90 |
| | | | 250/223 B |
| 2013/0076891 A1* | 3/2013 | Childress | G01N 21/9081 |
| | | | 348/127 |

(Continued)

FOREIGN PATENT DOCUMENTS

| CN | 102368137 A | 3/2012 |
| CN | 102915559 A | 2/2013 |

(Continued)

OTHER PUBLICATIONS

Qian et al., "3D Reconstruction of Transparent Objects with Position-Normal Consistency", 2016 IEEE Conference on Computer Vision and Pattern Recognition 30.6, Jun. 30, 2016, pp. 4369-4377.

(Continued)

*Primary Examiner* — Grace Q Li
(74) *Attorney, Agent, or Firm* — Polsinelli PC

(57) ABSTRACT

The present disclosure relates to a system for acquiring a correspondence between light rays of a transparent object. The system includes a camera device, a display device, a turntable and a control device; the camera device, the display device and the turntable are electrically connected with the control device respectively; the turntable is configured to rotate a transparent object; the control device is configured to acquire images corresponding to display device in the first preset position, which are photographed by the camera device through the transparent object at different rotation angles, to obtain a primary image set; acquire images corresponding to the display device in the second preset position, which are photographed by the camera device through the transparent object at different rotation angles, to obtain a secondary image set; and obtain the correspondence between light rays of the transparent object from different viewing angles.

11 Claims, 3 Drawing Sheets

(51) Int. Cl.
  *G01B 11/24* (2006.01)
  *G01B 11/26* (2006.01)

(56) References Cited

U.S. PATENT DOCUMENTS

| | | | |
|---|---|---|---|
| 2018/0188561 A1 | 7/2018 | Wang | |
| 2019/0269208 A1* | 9/2019 | Yun | A44C 17/00 |

FOREIGN PATENT DOCUMENTS

| | | | |
|---|---|---|---|
| CN | 103119512 A | 5/2013 |
| CN | 106683188 A | 5/2017 |
| CN | 106910243 A | 6/2017 |
| CN | 1069592078 A | 7/2017 |
| CN | 107240148 A | 10/2017 |
| CN | 108198238 A | 6/2018 |
| CN | 207541416 U | 6/2018 |
| CN | 108254954 A | 7/2018 |

OTHER PUBLICATIONS

Zhang et al., "A Flexible New Technique for Camera Calibration", IEEE Transactions on Pattern Analysis and Machine Intelligence 30.11, Nov. 30, 2000, pp. 1-21.

Zongker et al., "Environment Matting and Compositing", Proceedings of the 26th Annual Conference on Computer Graphics and Interactive Techniques 31.7, Jul. 31, 1999, pp. 205-214.

International Search Report dated Apr. 16, 2019 in PCT/CN2018/097188 (4 pages).

Written Opinion dated Apr. 16, 2019 in PCT/CN2018/097188 (4 pages).

Office Action dated Mar. 19, 2020 issued in corresponding Chinese Patent Application No. 201810833989.2 (6 pages).

Long, "Research of Optical-Touch Processing Algorithm in Real Time: A Master Thesis Submitted to University of Electronic Science and Technology of China", (81 pages).

* cited by examiner

SYSTEM FOR ACQUIRING CORRESPONDENCE BETWEEN LIGHT RAYS OF TRANSPARENT OBJECT

CROSS REFERENCE TO RELATED APPLICATIONS

This application is a continuation application of PCT Patent Application No. PCT/CN2018/097188, entitled "SYSTEM FOR ACQUIRING CORRESPONDENCE BETWEEN LIGHT RAYS OF TRANSPARENT OBJECT", filed on Jul. 26, 2018, the entire contents of which are incorporated herein by reference.

TECHNICAL FIELD

This application relates to the field of computer graphics, and more particularly, to a system for acquiring a correspondence between light rays of a transparent object.

BACKGROUND

Three-dimensional reconstruction based on vision refers to acquiring images of an object in a scene by a camera, analyzing and processing the images, and deriving three-dimensional information of the object in a real environment in combination with computer vision techniques. The three-dimensional reconstruction for a non-transparent object can be accomplished by technical schemes such as full-automatic scanning, multi-view stereo vision, photometric stereo method, and the like. Experiments have shown that these techniques can be effectively applied to non-transparent objects, and even to translucent objects.

However, because of the complex reflection and refraction involved in the light transport of transparent object, the conventional three-dimensional reconstruction algorithms, such as a scanning-based reconstruction algorithm, an image-based reconstruction algorithm, shape from shading and so on, will not be effective in data acquisition, so that the transparent object cannot be reconstructed. That is, the conventionally obtained correspondence data between light rays of transparent object are one-sided, and will result in low reliability of data.

SUMMARY

According to various embodiments of the present disclosure, provided is a system for acquiring a correspondence between light rays of a transparent object, to improve the reliability of data.

A system for acquiring a correspondence between light rays of a transparent object includes a camera device, a display device, a turntable, and a control device; the camera device, the display device and the turntable are respectively connected with the control device; the turntable is configured to rotate a transparent object to be measured;

the control device is configured to control the display device in a first preset position to display a preset image, and acquire images corresponding to the display device in the first preset position, which are photographed by the camera device through the transparent object at different rotation angles, to obtain a primary image set; control the display device in the first preset position to move to a second preset position, and acquire images corresponding to the display device in the second preset position, which are photographed by the camera device through the transparent object at different rotation angles, to obtain a secondary image set; and obtain the correspondence between light rays of the transparent object to be measured from different viewing angles according to the primary image set and the secondary image set.

The details of one or more embodiments of the present disclosure will be provided with reference to the following drawings and the description. Other features, objectives and advantages of the present disclosure will be obvious in the description, drawings and claims.

BRIEF DESCRIPTION OF THE DRAWINGS

To illustrate the technical solutions in the embodiments of the present disclosure more clearly, the accompanying drawings for describing the embodiments are introduced briefly hereafter. Apparently, the accompanying drawings in the following description are only some embodiments of the present disclosure, and based on the accompanying drawings, other drawings can be obtained by those skilled in the art without creative efforts.

DETAILED DESCRIPTION OF THE EMBODIMENTS

The present disclosure will be described in detail in combination with the accompanying drawings and embodiments, such that the objectives, the technical solutions and the advantages of the present disclosure will be clearer and better understood. It should be understood that the specific embodiments described herein are merely illustrative of the disclosure, but not intended to limit the present disclosure.

Figure 1:
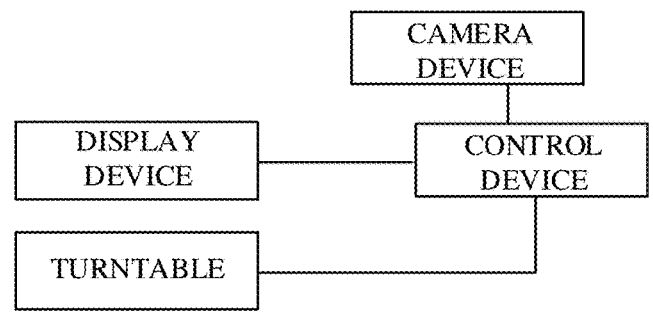
FIG. 1 is a structural block diagram of an embodiment of a system for acquiring a correspondence between light rays of a transparent object.

In an embodiment, a system for acquiring a correspondence between light rays of a transparent object, as shown in FIG. 1, includes a camera device, a display device, a turntable and a control device. The camera device, the display device and the turntable are electrically connected with the control device respectively. The turntable is configured to rotate the transparent object to be measured. The control device is configured to control the display device located at a first preset position to display a preset image, and acquire images corresponding to the display device located at the first preset position, which are photographed by the camera device through the transparent object at different rotation angles, to obtain a primary image set; control the display device located at the first preset position to move to a second preset position, and acquire images corresponding to the display device in the second preset position, which are photographed by the camera device through the transparent object to be measured at different rotation angles, to obtain a second image set; and obtain a correspondence between light rays of the transparent object to be measured from different viewing angles according to the primary image set and the secondary image set. Wherein, the control device can be, but is not limited to any one of various personal computers, notebooks, smartphones, tablets, and portable wearable devices.

The preset image is an image that represents a correspondence between rays and pixels of the transparent object to be measured from different viewing angles, and the preset image may be a preset binary Gray code sequence image. The primary image refers to an image formed by the transparent object and the preset image on the display device, when the display device is located at the first preset position, and when the transparent object is at a certain rotation angle. The primary image set includes primary images photographed when the transparent object is at different rotation angles. When the transparent object to be measured is at different angles, the primary images formed by the light rays of the display device passing through the transparent object to be measured are different. The display device is fixed at a certain position, and the transparent object to be measured is rotated to different angles, and a primary image set is obtained by photographing preset images displayed on the display device with the camera device through the transparent object rotated to different angles.

The secondary image refers to an image formed by the transparent object at a certain angle and the preset image on the display device located at the second preset. The secondary image set includes the secondary images photographed from different viewing angles. When the transparent object to be measured is at different angles, the secondary images formed by the light rays of the display device passing through the transparent object to be measured are different. The display device is fixed to a certain position, and the transparent object to be measured is rotated to different angles, and a secondary image set is obtained by photographing preset images displayed on the display device with the camera device through the transparent object rotated to different angles.

According to the system for acquiring the correspondence between light rays of the transparent object above, the control device is configured to control the display device in the first preset position to display the preset image, acquire images corresponding to the display device in the first preset position, which are photographed by the camera device through the transparent object at different rotation angles, and obtain the primary image set; control the display device in the first preset position to move to the second preset position, acquire images corresponding to the display device in the second preset position, which are photographed by the camera device through the transparent object at different rotation angles, and form the secondary image set; and obtain the correspondence between light rays of the transparent object to be measured from different viewing angles according to the primary image set and the secondary image set. In this way, the correspondence between light rays of the transparent object from different viewing angles can be acquired, thereby improving the reliability of the data of the correspondence between light rays, and constructing three-dimensional model of the transparent object via the correspondence between light rays of the transparent object from different viewing angles.

In an embodiment, the control device is further configured to obtain a transformation between a display device coordinate system and a turntable coordinate system, and obtain the correspondence between light rays of the transparent object to be measured from different viewing angles, according to the transformation between the display device coordinate system and the turntable coordinate system, the primary image set and the secondary image set.

The three-dimensional model of the object is constructed with reference to the coordinate system which it belongs to. The same object has different representations in different coordinate systems. The display device coordinate system refers to a coordinate system established on the base of the display device acting as a reference object; the turntable coordinate system refers to a coordinate system established on the base of the turntable acting as a reference object; and the transformation between the display device coordinate system and the turntable coordinate system refers to a conversion relationship between the coordinate system established on the base of the turntable acting as the reference object and the coordinate system established on the base of the display device acting as the reference object. According to the transformation between the display device coordinate system and the turntable coordinate system, the image pixels both in the primary image set and the secondary image set are analyzed and processed after being converted to the same coordinate system. Acquire the incident ray set and the corresponding transmitted ray set of the transparent object to be measured from different viewing angles, thereby obtaining the correspondence between light rays of the transparent object to be measured from different viewing angles.

In an embodiment, the control device is further configured to obtain a transformation between the display device coordinate system and the camera device coordinate system, and a transformation between the camera device coordinate system and the turntable coordinate system; and obtain the transformation between the display device coordinate system and a turntable coordinate system, according to the transformation between the camera device coordinate system and the turntable coordinate system and the transformation between the display device coordinate system and the camera device coordinate system.

The camera device coordinate system refers to a coordinate system established on the base of the camera device acting as a reference object, and the transformation between the display device coordinate system and the camera device coordinate system refers to a conversion relationship between a coordinate system established by using the display device as the reference object and a coordinate system established by using the camera device as a reference object. The transformation between the camera device coordinate system and the turntable coordinate system refers to a conversion relationship between a coordinate system established by using the camera device as the reference object and a coordinate system established by using the turntable as the reference object.

In an embodiment, the control device is further configured to control the display device located at the first preset position to display a preset chessboard pattern, and control the camera device to photograph the display device in the first preset position, to obtain a first chessboard pattern image; control the display device moved to the second preset position to display the preset chessboard pattern, and control the camera device to photograph the display device in the second preset position, to obtain a second chessboard pattern image; and obtain a transformation between the display device coordinate system and the camera device coordinate system according to the first chessboard pattern image and the second chessboard pattern image.

The first chessboard pattern image is photographed by the camera device and shows the content displayed on the display device located at the first preset location, and the second chessboard pattern image is photographed by the camera device and shows the content displayed on the display device located at the second preset location. The display device is adjusted to the first preset position, and a chessboard pattern is displayed on the display device to calibrate the position of the display device relative to the camera device at this time. After the transparent object is placed on the turntable, and after the primary image set and the secondary image set are acquired, the transparent object is removed from the turntable. At this time, the display device is located at the second preset position, and the chessboard pattern is displayed on the display device to calibrate the second preset position relative to the position of the camera device.

In an embodiment, the system further includes a calibration camera device connected with the control device; a calibration board is arranged on the turntable; the control device is further configured to obtain a correspondence between a calibration camera device coordinate system and the turntable coordinate system by photographing the calibration board located at a first preset calibration position with the calibration camera device; obtain a correspondence between the camera device coordinate system and the calibration camera device coordinate system by respectively photographing the calibration board located at a second preset calibration position with the camera device and the calibration camera device; and obtain the correspondence between the camera device coordinate system and the turntable coordinate system, according to the correspondence between the calibration camera device coordinate system and the turntable coordinate system, and the correspondence between the camera device coordinate system and the calibration camera device coordinate system.

The calibration board refers to a flat board having a pattern array of a fixed pitch. In the three-dimensional reconstruction, the calibration board can correct lens distortion, determine the conversion relationship between physical dimensions and pixels, and determine the relationship between the three-dimensional geometric position of a point on the surface of the space object and its corresponding point in the image. By photographing the flat board having the pattern array of a fixed spacing with a camera, the geometric model of the camera can be obtained through calculation of the calibration algorithm, thereby obtaining measurement and reconstruction with high precision. The calibration board is horizontally placed on the turntable, and at this time, the calibration board is in a first preset calibration position, and the calibration camera device can photograph the calibration board while the camera device cannot photograph the calibration board, and the rotation axis of the turntable is calibrated by the calibration camera device.

In an embodiment, the control device is further configured to obtain a first image and a second image by respectively photographing the calibration board at the second preset calibration position with the camera device and the calibration camera device; acquire a first extrinsic matrix of the calibration board based on the camera device coordinate system and a second extrinsic matrix of the calibration board based on the calibration camera device coordinate system; obtain the correspondence between the camera device coordinate system and the calibration camera device coordinate system, according to the first image, the second image, the first extrinsic matrix and the second extrinsic matrix. The calibration board is disposed and tilted on the turntable, and at this time, the calibration board is in the second preset calibration position, and the calibration camera device and the camera device can both photograph the calibration board, and the calibration camera device is configured to assist the camera device to calibrate the extrinsic matrix when the turntable is located at different positions.

In an embodiment, the control device is further configured to obtain a projection relationship of the camera device coordinate system according to the first image and the first extrinsic matrix; obtain a projection relationship of the calibration camera device coordinate system according to the second image and the second extrinsic matrix; and obtain a transformation between the camera device coordinate system and the calibration camera device coordinate system, according to the projection relationship of the camera device coordinate system and the projection relationship of the calibration camera device coordinate system.

The calibration board is disposed and tilted on the turntable, so that both the camera device and the calibration camera device can photograph. The extrinsic matrixes of the calibration board in the camera device coordinate system and in the calibration camera device coordinate system are estimated by a camera pose estimation algorithm. The first extrinsic matrix of the calibration board in the camera device coordinate system is $R_1$ and $T_1$, and the second extrinsic matrix of the calibration board in the calibration camera device coordinate system is $R_2$ and $T_2$. Assuming that there is an arbitrary point P in the world coordinate system at this time, the projection points of the point P in the two coordinate systems are calculated as follows:

$$P_1=[R_1|T_1]*P=R_1*P+T_1$$

$$P_2=[R_2|T_2]*P=R_2*P+T_2$$

Accordingly, get the transformation relationship between the point $P_2$ in the calibration camera device coordinate system and the point $P_1$ in the camera device coordinate system:

$$R_1^{T}*(P_1-T_1)=R_2^{T}*(P_2-T_2), \text{ namely}$$

$$P_1=R_1*R_2^{T}*(P_2-T_2)+T_1$$

In an embodiment, the control device is further configured to obtain a calibration image by photographing the calibration board located at the first preset calibration position with the calibration camera device; acquire the extrinsic matrix of the calibration board based on the calibration camera device coordinate system; and obtain the correspondence between the calibration camera device coordinate system and the turntable coordinate system, according to the calibration image and the extrinsic matrix.

When the calibration board is horizontally arranged on the turntable, only the calibration camera device can photograph the calibration board. The turntable is controlled to rotate the calibration board to different positions, and via the camera pose estimation algorithm, the extrinsic matrix of the calibration board in the calibration camera coordinate system is estimated to be $R_k'$, and $T_k'$, respectively, wherein k is the times of rotation performed by the turntable in one cycle. For example, if the turntable rotates through 5 degrees once, then k=72. In this case, Assuming that there is an arbitrary point Q in the standard coordinate system of the turntable located at a certain position, the projection point of the point Q in the calibration device coordinate system is represented as:

$$Q_2=[R_k'|T_k']*Q=R_k'*Q+T_k'$$

According to the transformation relationship between the calibration camera device coordinate system and the camera device coordinate system, the projection point of the point Q in the camera device coordinate system can be represented as:

$$Q_1 = R_1 * R_2^T * (Q_2 - T_2) + T_1, \text{ namely}$$

$$Q_1 = R_1 * R_2^T * (R_k'^* Q + T_k' - T_2) + T_1, \text{ namely}$$

$$Q_1 = R_1 * R_2^T * R_k'^* Q + [R_1 * R_2^T * (T_k' - T_2) + T_1]$$

According to the above equation, a point in the turntable coordinate system can be converted to the camera device coordinate system.

In an embodiment, the control device is further configured to control the display device in the first preset position to display the preset image, and control the turntable to rotate for one cycle and rotate through a preset interval angle once; and obtain the primary image set by acquiring images corresponding to the display device in the first preset position, which are photographed by the camera device through the transparent object to be measured from different rotation angles. The display device is placed in the first preset position, and the transparent object is arranged on the turntable, and the turntable is controlled to rotate the transparent object. For example, the turntable rotates 72 times, and rotates through 5 degrees once. Each time the turntable rotates to a position, the display device displays a binary Gray-code sequence image, and the data are acquired by the camera device.

In an embodiment, the control device is further configured to control the display device in the first preset position to move to the second preset position, and control the turntable to rotate for one cycle and rotate through a preset interval angle once; and obtain the secondary image set by acquiring images corresponding to the display device in the second preset position, which are photographed by the camera device through the transparent object from different rotation angles. When the turntable rotates for one cycle and rotates back to the starting position, the display device is adjusted to the second preset position, and the turntable is controlled to rotate the transparent object in the same direction, for example, the turntable rotates 72 times, and rotates through 5 degrees once. Each time the turntable rotates to a position, the display device displays a binary gray-code sequence image, and the data are acquired by the camera device.

In an embodiment, the control device is further configured to obtain the transformation between the camera device coordinate system and the turntable coordinate system, and obtain an intrinsic matrix of the camera device; obtain the transmitted ray set of the transparent object to be measured, according to the intrinsic matrix and the transformation between the camera device coordinate system and the turntable coordinate system; obtain the incident ray set of the transparent object to be measured according to the primary image set and the secondary image set; and obtain the correspondence between light rays of the transparent object to be measured from different viewing angles according to the incident ray set and the transmitted ray set.

A light path starts from the pixel corresponding to the display device located at the first preset position to the pixel corresponding to the display device located at the second preset position, then to the pixel on the imaging plane of the camera device, and finally to the projection center of the camera device. At the incident ray end, the pixel corresponding to the display device located at the first preset position is connected to the pixel corresponding to the display device located at the second preset position, forming the incident ray. At the transmitted ray end, the pixel on the imaging plane of the camera device is connected to the projection center of the camera device, forming the transmitted ray.

In an embodiment, the control device is further configured to obtain a first pixel set of the first position according to an image corresponding to the display device located at a first preset position; obtain a second pixel set of a second position according to images corresponding to the display device moved to the second preset position; and obtain the incident ray set of the transparent object to be measured according to the first pixel set and the second pixel set.

Figure 2:
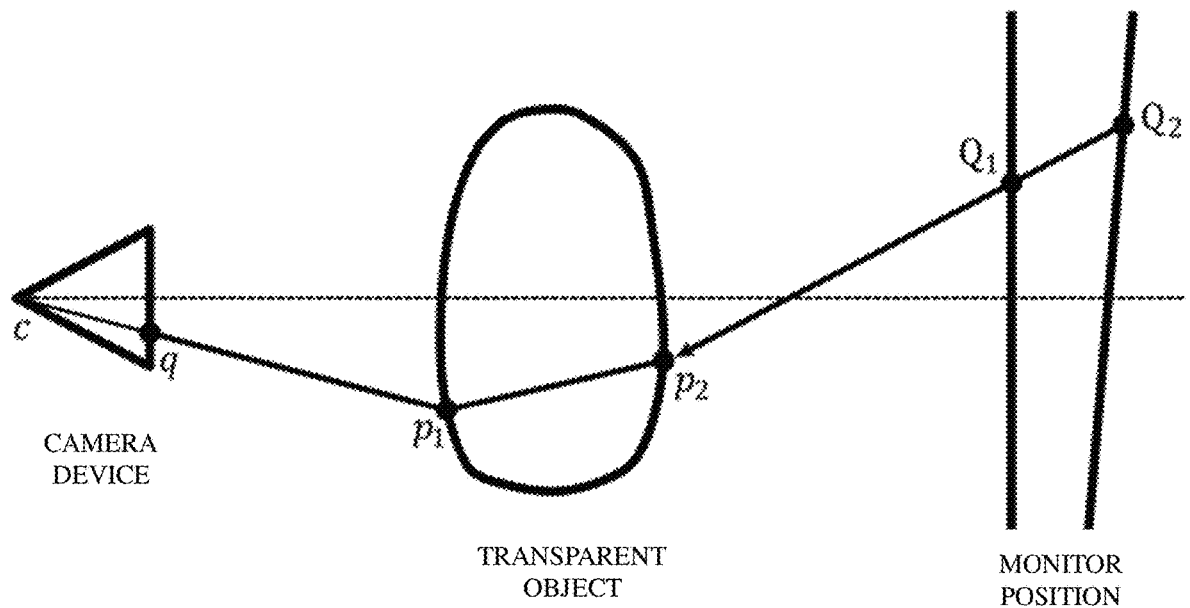
FIG. 2 is a schematic diagram of another embodiment illustrating incident rays and transmitted rays of a transparent object.

In an embodiment, assuming that the camera satisfies the theory of pinhole imaging in the case that the geometric information of the transparent object is unknown, the correspondence between the pixel on the background monitor and the pixel on the imaging plane of the camera device can be obtained via ray tracing and environmental matting techniques. FIG. 2 is a schematic diagram illustrating incident rays and transmitted rays of a transparent object, as shown in FIG. 2, the pixel $Q_1$ on the background monitor located at the first position corresponds to a point q, and the pixel $Q_2$ on the background monitor located at the second position corresponds to the point q. When the background monitor is the only light source in the scene, according to the forward ray tracing principle, an incident ray $Q_2Q_1$ can be obtained by a straight line connecting the points $Q_1$ and $Q_2$. Further, since the light entering the camera from the outside must pass through the projection center point c of the camera, the transmitted light can be obtained by a straight line connecting the point c and the point q. From the point of view of forward rays tracing, as for the transmitted ray from the pixel q on the imaging plane of the camera to the projection center point c of the camera, the corresponding incident ray can be obtained by the straight line connecting the two pixels $Q_1$ and $Q_2$ on the background monitor located at different positions. In the case that only two refractions occur, assuming that the light ray from $Q_2Q_1$ passes through the transparent object and intersects with the transparent object at the point $p_2$ and point $p_1$, and eventually passes through the point q and reaches the projection center point c of the camera. By connecting the corresponding points, a complete light path $Q_2$-$Q_1$-$p_2$-$p_1$-q-c is restored. According to Snell's theorem, the light refraction is closely related to the normal vector of the surface of the object, therefore the geometric information of the object can be calculated assuming that the light path can be restored. In practice, due to the lack of geometric information of the object, the point $p_1$ and point $p_2$ cannot be accurately obtained, and the point $p_1$ and point $p_2$ can only be estimated and obtained by optimizing gradually on the base of estimated parameters and the correspondence between the incident ray $Q_2Q_1$ and the transmitted ray qc, thereby restoring the three-dimensional shape of the object.

Figure 3:
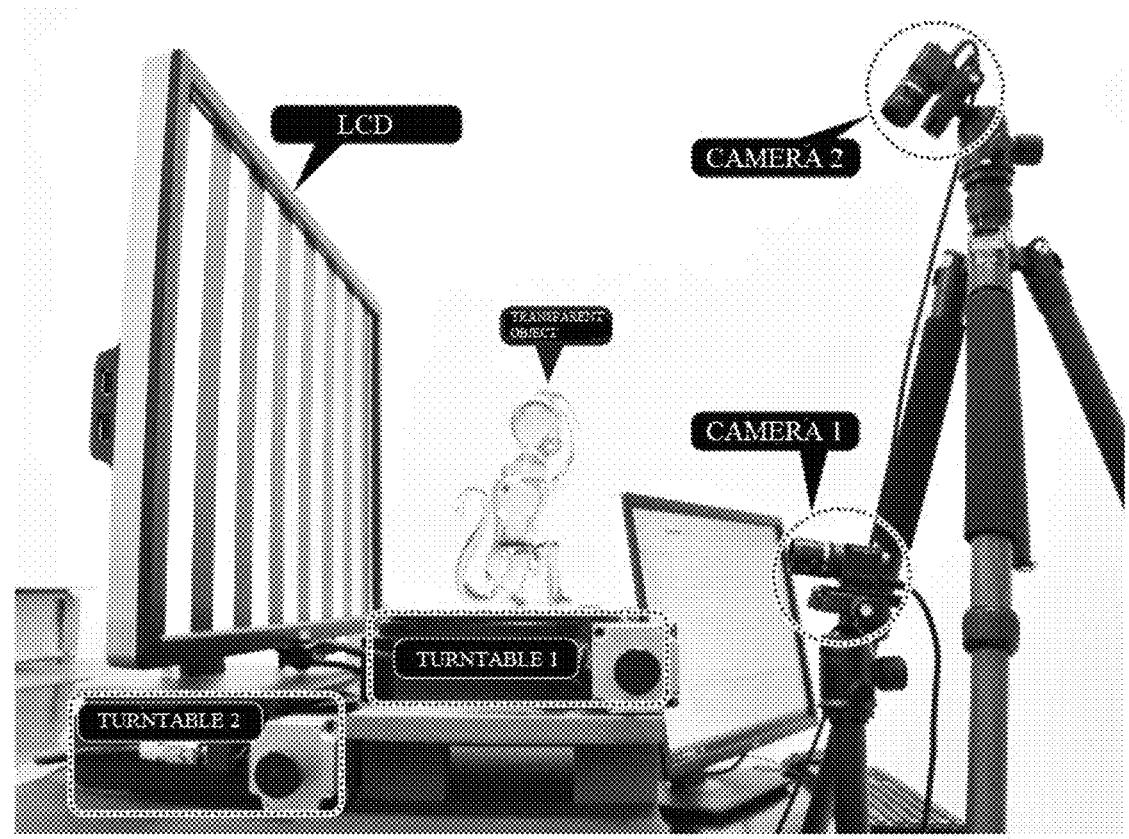
FIG. 3 is a schematic diagram of yet another embodiment illustrating a system for acquiring a correspondence between light rays of a transparent object.

Accordingly, a simple and effective system for acquiring the correspondence between light rays of a transparent object from multiple viewing angles is provided. As shown in FIG. 3, in the process of the experiment, two cameras, whose intrinsic matrixes are pre-calibrated, are disposed at fixed positions and are provided to assist in data acquisition. Wherein the camera 1 is disposed in front of the turntable 1 and the background monitor, and the camera 2 looks down facing the turntable 1 to calibrate the rotation axis of the turntable. A liquid crystal display is used as a unique light source and placed on the turntable 2, which is configured to accurately control the rotation of the display.

During data acquisition, the turntable 2 is first controlled to adjust the monitor to the first position, and a chessboard pattern is displayed on the monitor to calibrate the position of the monitor relative to the camera 1. The transparent object is then placed on the turntable 1, and the turntable 1 is controlled to rotate the object, for example, the turntable 1 rotates through 5 degrees once. Each time the turntable 1 rotates to a position, a binary gray-code sequence image is displayed on the monitor, and data are acquired by the camera 1, and the correspondence between the light rays and the pixels from the visual angle of the camera is extracted by using the environmental matting technique. After the turntable 1 rotates for one cycle, the turntable 2 is then controlled to adjust the monitor to the second position, and the above-described acquisition process is repeated. After all data acquisition is completed, the transparent object is removed from the turntable 1, and the chessboard pattern is displayed on the monitor to calibrate the position of the monitor relative to the camera 1.

The data acquisition process includes calibrating camera parameters and calculating the correspondences between light rays from different viewing angles. Assuming that the intrinsic matrix of the camera 1 and the intrinsic matrix of the camera 2 are pre-calibrated by using the Zhang Zhengyou calibration method, and are denoted as $K_1$ and $K_2$, respectively. As described above, the camera 2 is configured to calibrate the rotation axis of the turntable 1, and auxiliary calibrate the extrinsic matrix of the camera 1 located at different positions of the turntable. By tilting the calibration board on the turntable 1, both of the cameras can photograph, and the extrinsic matrixes $R_1$, $T_1$ and $R_2$, $T_2$ of the calibration board in two different camera coordinate systems are estimated by using the camera pose estimation algorithm. Assuming that there is an arbitrary point P in the world coordinate system at this time, and that all calculations are performed in the homogeneous coordinate system, and that the perspective division operation from the three-dimensional coordinate system to the two-dimensional pixel coordinate system is not taken into consideration, the projection points of the point P in the two camera coordinate systems are calculated as follows:

$$P_1=[R_1|T_1]*P=R_1*P+T_1 \text{ (In the camera 1 coordinate system)}$$

$$P_2=[R_2|T_2]*P=R_2*P+T_2 \text{ (In the camera 2 coordinate system)}$$

Based on this, the transformation relationship between the point $P_2$ in the camera 2 coordinate system and the point $P_1$ in the camera 1 coordinate system can be acquired, as shown by Equation (1):

$$R_1^{T}*(P_1-T_1)=R_2^{T}*(P_2-T_2), \text{ namely}$$

$$P_1=R_1*R_2^{T}*(P_2-T_2)+T_1 \qquad (1)$$

After the transformation relationship between points in two different camera coordinate systems is obtained, the calibration board on the turntable 1 is horizontally arranged. In this case, only the camera 2 can photograph the calibration board, and the turntable 1 is controlled to rotate the calibration board to different positions. By using the camera pose estimation algorithm, the extrinsic matrix of the calibration board in the camera 2 coordinate system is estimated to be $R_k'$ and $T_k'$, respectively, wherein k indicates the times of rotation performed by the turntable 1 in one cycle. For example, if the turntable rotates through 5 degrees once, then, k=72. In this case, Assuming that there is an arbitrary point Q in the standard coordinate system of the turntable 1 at a certain position, the projection point of the point Q in the camera 2 coordinate system is:

$$Q_2=[R_k'|T_k']*Q=R_k'*Q+T_k'$$

According to Equation (1), the projection point of the point Q in the camera 1 coordinate system can be transformed and calculated to be:

$$Q_1=R_1*R_2^{T}*(Q_2-T_2)+T_1, \text{ namely}$$

$$Q_1=R_1*R_2^{T}*(R_k'*Q+T_k'-T_2)+T_1, \text{ namely}$$

$$Q_1=R_1*R_2^{T}*R_k'*Q+[R_1*R_2^{T}*(T_k'-T_2)+T_1] \qquad (2)$$

According to Equation (2), a point in the turntable 1 coordinate system can be converted to the camera 1 coordinate system, so the extrinsic matrix of the position of the turntable 1 relative to the camera 1 can be represented as follows:

$$R=R_1*R_2^{T}*R_k' \qquad (3)$$

$$T=R_1*R_2^{T}*(T_k'-T_2)+T_1 \qquad (4)$$

After the extrinsic matrixes of different positions of the turntable 1 relative to the camera 1 are calculated according to the equation above, it is necessary to further calculate the correspondence between the light rays at the corresponding position. Assuming that the real physical dimensions of the liquid crystal display are the length w and the width h respectively, and that the resolution is length W×width H, then the real physical dimensions of each pixel are $$\frac{w}{W}$$

in the horizontal direction and $$\frac{h}{H}$$

in the vertical direction.

On the basis of the acquired data, assuming that, when the turntable 1 is located at a certain position, the relationship between the light ray and the pixels has been calculated by using the environment matting technique, and that the origin of the monitor coordinate system is set at the center of the monitor, and that the monitor coordinate system is consistent with another monitor coordinate system selected during calibrating the position of the camera 1, the light path starts from the pixel $(x_2, y_2)$ on the monitor located at the second position to the pixel $(x_1, y_1)$ on the monitor located at the first position, then to the pixel (x,y) on the imaging plane of the camera, and finally to the projection center c of the camera. In addition, when the monitor is located at two different positions on the turntable 2, the monitor's extrinsic matrixes calibrated relative to the camera 1 are respectively $M_1$, $N_1$ and $M_2$, $N_2$.

The pixels on the monitor located at the two positions are converted to their corresponding monitor coordinate systems and are represented in the form of homogeneous coordinates as follows:

$$q_2 = \left[ x_2 * \frac{w}{W} - \frac{w}{2}, \frac{h}{2} - y_2 * \frac{h}{H}, 1.0 \right]^T$$

$$q_1 = \left[ x_1 * \frac{w}{W} - \frac{w}{2}, \frac{h}{2} - y_1 * \frac{h}{H}, 1.0 \right]^T$$

According to the projection matrix, these two pixels are respectively converted to the camera 1 coordinate system as follows:

$$q_2{}^{c1} = M_2 * q_2 + T_2$$

$$q_1{}^{c1} = M_1 * q_1 + T_1$$

According to the Equation (3) and the Equation (4), the points in the camera 1 coordinate system are converted to the standard coordinate system of the position of the turntable 1, and thereby getting:

$$R * q_2{}^w + T = q_2{}^{c1} \rightarrow q_2{}^w = R^T * (q_1{}^{c1} - T) \quad (5)$$

$$R * c^w + T = c \rightarrow c^w = R^T * (c - T) = -R^T T \quad (6)$$

In addition, at the transmitted ray end, the pixel on the imaging plane of the camera is converted to be $q = [x, y, 1]^T$ in the homogeneous coordinate, and according to an intrinsic matrix of the camera 1, the pixel is converted to be $q^{c1} = K_1^{-1} * q$ in the camera 1 coordinate system.

The coordinates of the projection center c of the camera 1 in the camera 1 coordinate system are $c = [0, 0, 0]^T$, similarly, the two pixels above are converted to the standard coordinate system of the position of the turntable 1 according to Equations (3) and (4), thereby getting:

$$R * q^w + T = q^{ci} \rightarrow q^w = R^T * (q^{c1} - T) \quad (7)$$

$$R * c^w + T = c \rightarrow c^w = R^T * (c - T) = -R^T T \quad (8)$$

According to Equation (5), Equation (6), Equation (7) and Equation (8), a correspondence between light rays of the turntable 1 located at this position can be obtained as follows:

|  | Starting Point | Direction (to be normalized) |
| --- | --- | --- |
| Incident ray | $q_2{}^w$ | $q_1{}^w - q_2{}^w$ |
| Transmitted ray | $q^w$ | $c^w - q^w$ |

When the turntable 1 rotates to a different position, that is, the corresponding transparent object is located in different viewing angles of the camera 1, the correspondences between the incident ray and the transmitted ray of the transparent object from different viewing angles of the camera can be calculated to serve as geometric information for restoring different portions of the transparent object.

The system for acquiring the correspondence between light rays of the transparent object and the calculation method therefor have universality, and can acquire the correspondence between light rays of the transparent object from different viewing angles of the camera. In addition, the method for data acquisition is fully automatic and artificial interference in the data acquisition process is not required. In the present application, the correspondences between light rays are acquired through rotating around an object for one cycle in the horizontal direction, which can be extended to a multi-camera, such as a camera array, data acquisition system.

Figure 4:
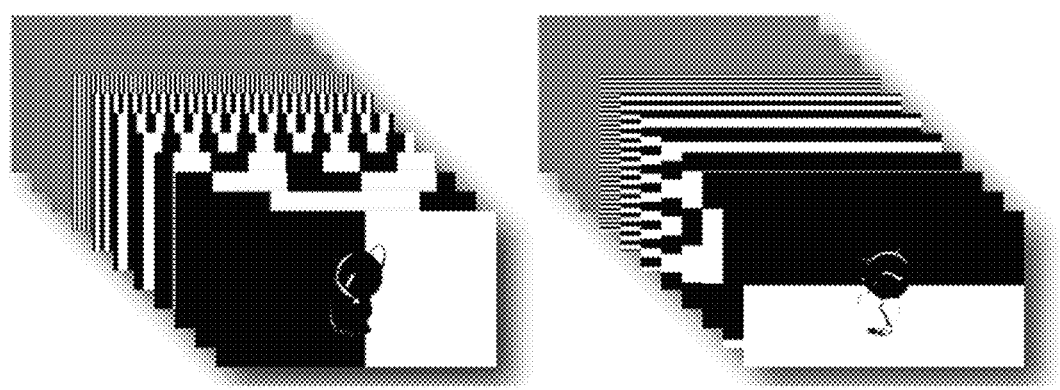
FIG. 4 is a schematic diagram of yet another embodiment illustrating data acquired in a virtual acquisition system by using a Kitten model.
Figure 5:
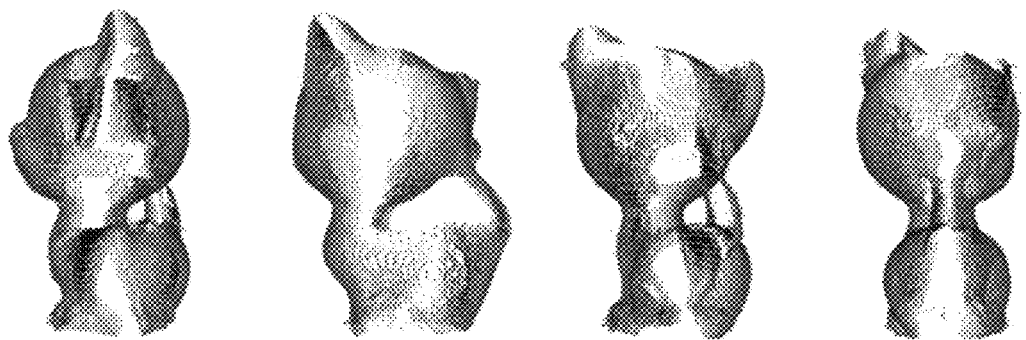
FIG. 5 is a schematic diagram of yet another embodiment illustrating three-dimensional shapes of point cloud of a transparent object, which are optimized and obtained on a base of the correspondence between light rays of the transparent object to be measured from different viewing angles.

In order to verify the validity of the acquisition system and the accuracy of the calculation method, an acquisition system is constructed in a virtual environment, and a camera photographing is simulated by POV-Ray rendering. In the simulation system, the data are acquired through the Kitten model, and FIG. 4 shows a rendering result using the Kitten model. By photographing the Gray code sequence displayed on the background monitor, the horizontal stripe sequences and the vertical stripe sequences respectively encode the row pixels and the column pixels of the monitor. According to these images, the correspondences between light and pixels at different monitor positions can be calculated by environmental matting technique. In the virtual setting, the turntable 1 rotates through 45 degrees once, so that the correspondences between light rays of the camera from eight viewing angles can be calculated by the calculation method above. The eight viewing angles are divided into four pairs according to the front-to-back correspondences of the camera, and the geometric information of the surface of the object is restored by a preset algorithm. The generated point cloud distribution is shown in FIG. 5, which can depict the geometric information of the original model from different viewing angles.

In practice, the acquisition system is constructed by the apparatus shown in FIG. 3. A monkey model with complex geometric features on its surface is used in the experiment. The correspondence between light rays is calculated assuming that the camera 1 satisfies the theory of pinhole imaging, so the aperture of the camera 1 is reduced to approximate the assumption during acquiring data. Furthermore, since it is required that the monitor is the only light source in the scene, the entire set of experiment equipment needs to be placed in a dark environment during acquiring data, to avoid the influence of ambient light. Although the transparent object is arranged in front of the background monitor, there are still some areas on the transparent object that cannot be illuminated by the monitor, and these pixels are ignored during calculating the correspondence between light rays.

It should be understood that the steps are not necessarily sequentially performed by the control device as indicated by the reference numbers. Unless explicitly stated herein, the execution of these steps is not strictly sequential, and the steps may be performed in other sequences. Moreover, at least part of the steps in the embodiments may include a plurality of sub-steps or stages that are not necessarily performed at the same time, but may be performed at different time, and the sub-steps or stages is not necessarily performed sequentially, but may be performed in turn or alternately with other steps, or with at least part of the sub-steps or the stages of other steps.

It should be understood for the ordinary skilled in the art that, all or part of the processes in the methods of the above embodiments can be implemented through computer programs controlling corresponding hardware; the computer programs can be stored in the non-volatile computer readable storage medium; and when the computer programs are executed, they may include the processes of the above embodiments of the control device. Any references to memory, storage, databases or other medium described in all embodiments provided by the present invention may include non-volatile and/or volatile memory. The Non-volatile memory can include Read-Only Memory (ROM), Programmable ROM (PROM), Erasable Programmable ROM (EPROM), Electrically Erasable Programmable ROM (EEPROM), or flash memory. The volatile memory may include Random Access memory (RAM) or external cache memory. Not illustrated as limitation but as explanations, RAM may be any one of Static RAM (SRAM), Dynamic RAM (DRAM), Synchronous DRAM (SDRAM), Double Data Rate SDRAM (DDR SDRAM), Enhanced SDRAM (ESDRAM), Synchronization Link DRAM (SLDRAM), Rambus Direct RAM (RDRAM), Direct Rambus Dynamic RAM (DRDRAM), and Rambus Dynamic RAM (RDRAM), etc.

The foregoing respective technical features involved in the respective embodiments can be combined arbitrarily. For the sake of concision of the description, not all possible combinations of the technical features of the embodiments above are described. However, as long as there is no contradiction in the combinations of these technical features, the combinations should be considered to be within the scope of the description.

What described above are several embodiments of the present invention, and these embodiments are specific and in details, but not intended to limit the scope of the present invention. It should be understood by the skilled in the art that various modifications and improvements can be made without departing from the scope of the present invention. Therefore, the scope of the present disclosure is defined by the appended claims.

What is claimed is:

1. A system for acquiring a correspondence between light rays of a transparent object, comprising a camera device, a display device, a turntable, and a control device, wherein the camera device, the display device and the turntable are electrically connected with the control device respectively; the turntable is configured to rotate a transparent object to be measured;

the control device is configured to control the display device in a first preset position to display a preset image, and acquire images corresponding to the display device in the first preset position, which are photographed by the camera device through the transparent object at different rotation angles, to obtain a primary image set; control the display device in the first preset position to move to a second preset position, and acquire images corresponding to the display device in the second preset position, which are photographed by the camera device through the transparent object at different rotation angles, to obtain a secondary image set; and obtain the correspondence between light rays of the transparent object to be measured from different viewing angles according to the primary image set and the secondary image set; and wherein the control device is further configured to acquire a transformation between a display device coordinate system and a turntable coordinate system, and obtain the correspondence between light rays of the transparent object to be measured from different viewing angles, according to the transformation between the display device coordinate system and the turntable coordinate system, the primary image set and the secondary image set.

2. The system according to claim 1, wherein the control device is further configured to acquire a transformation between the display device coordinate system and a camera device coordinate system, and a transformation between the camera device coordinate system and a turntable coordinate system; and obtain a transformation between the display device coordinate system and the turntable coordinate system, according to the transformation between the camera device coordinate system and the turntable coordinate system, and the transformation between the display device coordinate system and the camera device coordinate system.

3. The system according to claim 2, wherein the control device is further configured to control the display device located at the first preset position to display a preset chessboard pattern, and control the camera device to photograph the display device located at the first preset position, to obtain a first chessboard pattern image; control the display device moved to the second preset position to display the preset chessboard pattern, and control the camera device to photograph the display device located at the second preset position, to obtain a second chessboard pattern image; and obtain a transformation between the display device coordinate system and the camera device coordinate system according to the first chessboard pattern image and the second chessboard pattern image.

4. The system according to claim 2, further comprising a calibration camera device connected with the control device, wherein a calibration board is arranged on the turntable; and the control device is further configured to control the calibration camera device to photograph the calibration board located at a first preset calibration position, to obtain a transformation between the calibration camera device coordinate system and the turntable coordinate system; control the camera device and the calibration camera device to photograph the calibration board located at a second preset calibration position respectively, to obtain a transformation between the camera device coordinate system and the calibration camera device coordinate system; and obtain a transformation between the camera device coordinate system and the turntable coordinate system, according to the transformation between the calibration camera device coordinate system and the turntable coordinate system, and the transformation between the camera device coordinate system and the calibration camera device coordinate system.

5. The system according to claim 4, wherein the control device is further configured to control the camera device and the calibration camera device to photograph the calibration board at the second preset calibration position respectively, to obtain a first image and a second image; acquire a first extrinsic matrix of the calibration board based on the camera device coordinate system and a second extrinsic matrix of the calibration board based on the calibration camera device coordinate system; obtain a transformation between the camera device coordinate system and the calibration camera device coordinate system, according to the first image, the second image, the first extrinsic matrix and the second extrinsic matrix.

6. The system according to claim 5, wherein the control device is further configured to obtain a projection relationship of the camera device coordinate system according to the first image and the first extrinsic matrix; obtain a projection relationship of the calibration camera device coordinate system according to the second image and the second extrinsic matrix; obtain a transformation between the camera device coordinate system and the calibration camera device coordinate system, according to the projection relationship of the camera device coordinate system and the projection relationship of the calibration camera device coordinate system.

7. The system according to claim 4, wherein the control device is further configured to control the calibration camera device to photograph the calibration board located at the first preset calibration position, to obtain a calibration image; acquire an extrinsic matrix of the calibration board based on the calibration camera device coordinate system; and obtain a transformation between the calibration camera device coordinate system and the turntable coordinate system according to the calibration image and the extrinsic matrix.

8. The system according to claim 1, wherein the control device is further configured to control the display device in the first preset position to display the preset image, and control the turntable to rotate for one cycle and rotate through a preset interval angle once; acquire the images corresponding to the display device located at the first preset position, which are photographed by the camera device through the transparent object at different rotation angles, to obtain the primary image set.

9. The system according to claim 1, wherein the control device is further configured to control the display device in the first preset position to move to the second preset position, and control the turntable to rotate for one cycle and rotate through a preset interval angle; acquire images corresponding to the display device located at the second preset position, which are photographed by the camera device through the transparent object to be measured from different rotation angles, to obtain the secondary image set.

10. A system for acquiring a correspondence between light rays of a transparent object, comprising a camera device, a display device, a turntable, and a control device, wherein the camera device, the display device and the turntable are electrically connected with the control device respectively; the turntable is configured to rotate a transparent object to be measured;

the control device is configured to control the display device in a first preset position to display a preset image, and acquire images corresponding to the display device in the first preset position, which are photographed by the camera device through the transparent object at different rotation angles, to obtain a primary image set control the display device in the first preset position to move to a second preset position, and acquire images corresponding to the display device in the second preset position, which are photographed by the camera device through the transparent object at different rotation angles, to obtain a secondary image set and obtain the correspondence between light rays of the transparent object to be measured from different viewing angles according to the primary image set and the secondary image set; and wherein the control device is further configured to acquire a transformation between a camera device coordinate system and a turntable coordinate system, and acquire an intrinsic matrix of the camera device; obtain a transmitted ray set of the transparent object to be measured, according to the intrinsic matrix of the camera device and the transformation between the camera device coordinate system and the turntable coordinate system; obtain an incident ray set of the transparent object to be measured according to the primary image set and the secondary image set; and obtain the correspondence between light rays of the transparent object to be measured from different viewing angles according to the incident ray set and the transmitted ray set.

11. The system according to claim 10, wherein the control device is further configured to obtain a first pixel set of a first position according to images corresponding to the display device located at the first preset position; obtain a second pixel set of a second position according to images corresponding to the display device moved to the second preset position; obtain an incident ray set of the transparent object to be measured according to the first pixel set and the second pixel set.

* * * * *